US011162015B2

(12) United States Patent
Pisklak et al.

(10) Patent No.: US 11,162,015 B2
(45) Date of Patent: Nov. 2, 2021

(54) GEOPOLYMER FORMULATIONS FOR MITIGATING LOSSES

(71) Applicant: Halliburton Energy Services, Inc., Houston, TX (US)

(72) Inventors: Thomas Jason Pisklak, Cypress, TX (US); Heloisa Helena Fabricio Fernandes, The Woodlands, TX (US); Ronnie Glen Morgan, Waurika, OK (US); Juan Humberto Martinez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/791,282

(22) Filed: Feb. 14, 2020

(65) Prior Publication Data

US 2021/0253934 A1 Aug. 19, 2021

(51) Int. Cl.
*E21B 33/138* (2006.01)
*C09K 8/487* (2006.01)
*E21B 21/00* (2006.01)
*C09K 8/42* (2006.01)
*C09K 8/50* (2006.01)

(52) U.S. Cl.
CPC .............. *C09K 8/487* (2013.01); *C09K 8/426* (2013.01); *C09K 8/501* (2013.01); *E21B 21/003* (2013.01); *E21B 33/138* (2013.01)

(58) Field of Classification Search
None
See application file for complete search history.

(56) References Cited

U.S. PATENT DOCUMENTS

| 5,358,044 | A  | 10/1994 | Hale et al. |
| 7,794,537 | B2 | 9/2010  | Barlet-Gouedard et al. |
| 7,846,250 | B2 | 12/2010 | Barlet-Gouedard et al. |
| 8,360,145 | B2 | 1/2013  | Kalman et al. |
| 8,535,437 | B2 | 9/2013  | Perishikova et al. |
| 8,685,903 | B2 | 4/2014  | Ravi et al. |

(Continued)

FOREIGN PATENT DOCUMENTS

| WO | 2014/100604 A1 | 6/2014 |
| WO | 2018/009199 A1 | 1/2018 |

OTHER PUBLICATIONS

Synthesis and Characterization of materials based on inorganic polymers of alumina and silica: sodium polysialate polymers. Int. J. Inorg. Mat., (2000), 2, 309-317.

(Continued)

*Primary Examiner* — Andrew Sue-Ako
(74) *Attorney, Agent, or Firm* — Thomas Rooney; Baker Botts L.L.P.

(57) ABSTRACT

Methods and compositions for treating subterranean formations to mitigate lost circulation are provided. The methods of the present disclosure include forming a treatment fluid including one or more geopolymer lost circulation materials; introducing the treatment fluid into at least a portion of a subterranean formation that includes at least one loss zone; activating the geopolymer lost circulation materials to form a geopolymer that imparts a thixotropic property to the treatment fluid; and allowing the treatment fluid exhibiting the thixotropic property to at least partially reduce a rate of loss associated with the loss zone.

17 Claims, 2 Drawing Sheets

(56) References Cited

U.S. PATENT DOCUMENTS

| | | |
|---|---|---|
| 8,851,173 B2 | 10/2014 | Brothers et al. |
| 9,189,685 B2 | 11/2015 | Nosaka |
| 9,206,343 B2 | 12/2015 | Perishikova et al. |
| 9,206,345 B2 | 12/2015 | Weaver et al. |
| 9,222,010 B2 | 12/2015 | Porcherie et al. |
| 9,346,711 B2 | 5/2016 | Chatterji et al. |
| 9,394,202 B2 | 7/2016 | Porcherie et al. |
| 9,534,165 B2 | 1/2017 | Agapiou et al. |
| 10,266,746 B1 | 4/2019 | Rahman et al. |
| 10,457,601 B2 | 10/2019 | Thomas et al. |
| 10,876,042 B2 | 12/2020 | Qu et al. |
| 2008/0028994 A1 | 2/2008 | Barlet-Goudedard et al. |
| 2011/0073311 A1 | 3/2011 | Porcherie et al. |
| 2011/0284223 A1 | 11/2011 | Porcherie et al. |
| 2012/0241155 A1 | 9/2012 | Ali et al. |
| 2013/0266380 A1 | 10/2013 | Capron et al. |
| 2014/0048264 A1 | 2/2014 | Chatterji et al. |
| 2014/0076568 A1 | 3/2014 | McDonald et al. |
| 2014/0166285 A1 | 6/2014 | Santra et al. |
| 2014/0367103 A1 | 12/2014 | Michaux et al. |
| 2015/0299042 A1 | 10/2015 | Hesse et al. |
| 2015/0315875 A1 | 11/2015 | Chatterji et al. |
| 2016/0153274 A1 | 6/2016 | Hull et al. |
| 2017/0137322 A1 | 5/2017 | Seo |
| 2017/0137694 A1 | 5/2017 | van Oort et al. |
| 2017/0334779 A1 | 11/2017 | Gong et al. |
| 2018/0029937 A1 | 2/2018 | Kondratowicz et al. |
| 2019/0367797 A1* | 12/2019 | Morgan ................. C09K 8/467 |
| 2020/0270507 A1* | 8/2020 | Han Tan ................ C04B 28/04 |

OTHER PUBLICATIONS

International Search Report and Written Opinion issued in related PCT Application No. PCT/US2020/018596 dated Oct. 30, 2020, 13 pages.

* cited by examiner

GEOPOLYMER FORMULATIONS FOR MITIGATING LOSSES

BACKGROUND

The present disclosure relates to systems and methods for treating subterranean formations.

Cementitious compositions may be used in a variety of subterranean operations. For example, in subterranean well construction, a pipe string (e.g., casing, liners, expandable tubulars, etc.) may be run into a well bore and then cemented in place. The process of cementing the pipe string in place is commonly referred to as "primary cementing." In a primary cementing method, a cementitious composition may be pumped into an annulus (between the walls of the well bore and the exterior surface of the pipe string disposed therein). The cementitious composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids from the formation into the annulus and potentially to the surface, as well as protecting the pipe string from corrosion. Cementitious compositions also may be used in remedial cementing methods, for example, to seal cracks or holes in pipe strings, failed cement sheaths, and/or to seal highly permeable formation zones or fractures, and to place a cement plug for various purposes, and the like.

When drilling a well, many challenges can occur, one of which is sometimes called "lost circulation." The term lost circulation may refer to the total or partial loss of well bore fluids such as, but not limited to, drilling muds, spacers; cement slurries or water into highly permeable zones, cavernous formations and fractures or voids. Such openings may be naturally occurring or induced by pressure exerted during pumping operations. Lost circulation can be an expensive and time-consuming problem. In performing a cementing operation, a cementitious composition may be pumped as a fluid (e.g., in the form of a suspension or a slurry) into a desired location in the wellbore. The cementitious composition may exert hydrostatic and pumping (friction) pressure against the subterranean rock formations and may encounter lost circulation conditions. During cementing, lost circulation of the cementitious composition may compromise the quality of the cement job, reducing annular coverage, leaving casing exposed to corrosive subterranean fluids, and failing to provide adequate zonal isolation. Lost circulation also may be a problem encountered during well-completion and workover operations, potentially causing formation damage, lost reserves and even loss of the well.

One method that has been developed to control lost circulation involves the placement of lost circulation materials into the lost circulation zone. Lost circulation materials may include fibrous, lamellated or granular materials. The lost circulation materials may be placed into the formation, inter alia, as part of a drilling fluid, cementing fluid, or as a separate lost circulation fluid to attempt to control and/or prevent lost circulation. For a number of reasons, use of lost circulation materials may not provide a desirable level of lost circulation control in all circumstances. Another method that has been developed to control lost circulation involves the placement of certain settable compositions into the well bore to seal the lost circulation zone. The settable composition ideally should maintain a low viscosity while under shear, but, when allowed to remain static, the composition should develop gel strength quickly with the ability to thin and flow when shear is re-applied. Rapid development of compressive strength also may be desired after placement into the lost circulation zone. Low-density cement compositions can be used but may not exhibit the properties required to successfully seal the zone. Certain setting compositions that can be used include, for example, mixtures of clay and aqueous rubber latex or hydratable polymers, which can become semi-solid upon contact with the drilling fluid, sealing the lost circulation zone. Cement can be added to these systems where additional strength is desired.

BRIEF DESCRIPTION OF THE DRAWINGS

These drawings illustrate certain aspects of some of the embodiments of the present disclosure and should not be used to limit or define the claims.

Figure 1:
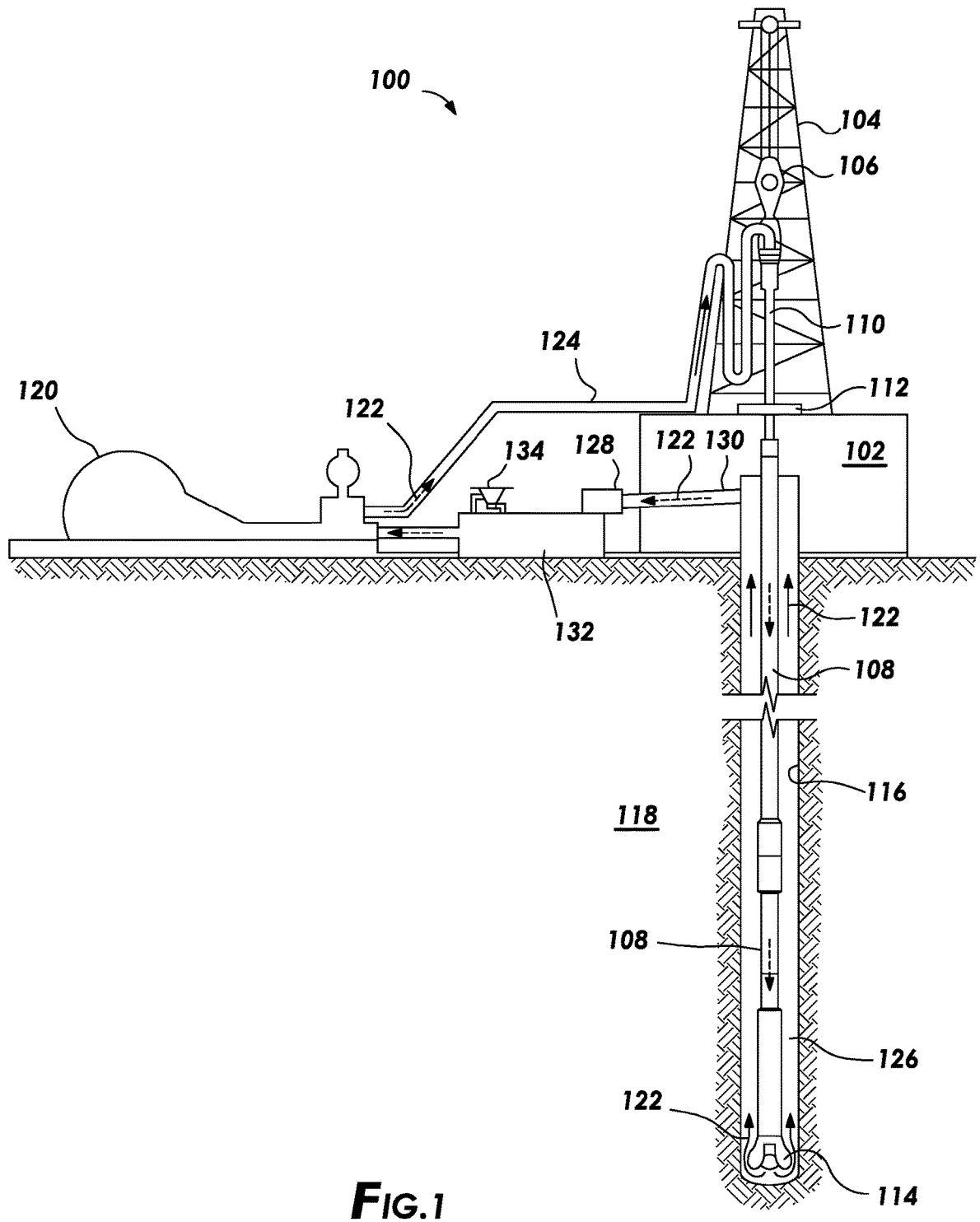
FIG. 1 is a schematic diagram of a system that may deliver the treatment fluids of the present disclosure to a downhole location in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and compositions for treating subterranean formations. More particularly, the present disclosure relates to methods and compositions for servicing subterranean formations and, in certain embodiments, to the use of compositions in a well bore to mitigate lost circulation.

As used herein, "loss zone" refers to a portion of a subterranean formation into which fluids in a wellbore may be lost. In certain embodiments, loss zones may include voids, vugular zones, washouts, lost circulation zones, perforations, natural fractures, induced fractures, and any combination thereof.

As used herein, the term "set" refers to the process of a liquid material transitioning to a harder or more solid material by curing. For example, in certain embodiments, a fluid may be considered "set" when the shear storage modulus is greater than the shear loss modulus of the fluid. In certain embodiments, a fluid may be considered "set" or at least partially set when it forms a gel.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, cementing operations, drilling operations, fracturing operations, gravel packing operations, acidizing operations, scale dissolution and removal, consolidation operations, and the like.

As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids may be used in, e.g., cementing, well drilling, completion, and stimulation operations. Examples of such treatment fluids include, inter alia, cementing fluids, completion fluids, drilling fluids, well cleanup fluids, workover fluids, conformance fluids, gravel pack fluids, acidizing fluids, fracturing fluids, spacer fluids, efficiency fluids, and the like. Treatment fluids may contain additives to impart desired physical and/or chemical characteristics to the fluid.

The present disclosure provides methods and compositions for using treatment fluids that may include settable geopolymers, which can be formulated to exhibit thixotropic behavior and utilized to mitigate lost circulation. Without limiting the disclosure to any particular theory or mechanism, in some embodiments of the present disclosure, geopolymers can be formulated to exhibit enhanced thixotropic behavior. In certain embodiments, a thixotropic geopolymer formulation can be placed in a subterranean formation using conventional cementing and pumping equipment. In some embodiments, after placement, once pumping has ceased, gel strength may rapidly develop and increase over time. In one or more embodiments, this thixotropic function may prevent or limit the geopolymer from further penetrating the loss zone, and as time progresses, the geopolymer may cure and develop compressive strength. In certain embodiments, the geopolymer may be formulated such that only low compressive strengths are developed for operations not requiring higher compressive strengths.

The geopolymer lost circulation materials of the present disclosure may be used in a variety of applications and environments in which plugging a loss zone may be desired. Examples of applications suitable for certain embodiments of the present disclosure may include, but are not limited to, use in subterranean formations, and/or downhole applications (e.g., cementing, drilling, fracturing, completions, oil production). In certain embodiments, geopolymer lost circulation materials may be applicable to injection wells, monitoring wells, and/or production wells, including hydrocarbon or geothermal wells and wellbores. In other embodiments, the geopolymer lost circulation materials may be introduced into a subterranean formation, for example, via a wellbore penetrating at least a portion of a subterranean formation. Addressing fluid loss that occurs during cementing or other downhole operations may be important for mitigating or preventing severe to total lost circulation and/or protecting the integrity and safety of subsequent primary cementing operations.

Among the many potential advantages to the methods and compositions of the present disclosure, only some of which are alluded to herein, the methods, compositions, and systems of the present disclosure may provide geopolymer lost circulation materials that can be pumped through a bottom hole assembly ("BHA") to stop losses of well bore fluids during well construction. In certain embodiments, geopolymer slurries may be formulated that exhibit thixotropic properties such that the slurries can be utilized to stop seepage (i.e., 1 to 10 bbl/hr losses), partial (i.e., 10 to 500 bbl/hr losses), severe (i.e., >500 bbl/hr losses), and total losses of treatment fluids. The methods and systems of the present disclosure may provide treatment fluids that may be used subsequent to drilling operations but prior to primary cementing operations to mitigate or prevent lost circulation problems.

The methods and systems of the present disclosure provide treatment fluids that may include one or more geopolymer lost circulation materials. In certain embodiments, the geopolymer lost circulation materials of the present disclosure may include an aluminosilicate source, a metal silicate source, an activator, and water. In one or more embodiments, one or more components of the geopolymer lost circulation materials may react to form a geopolymer. A geopolymer may be described as an inorganic polymer that forms long-range, covalently bonded, non-crystalline networks. Geopolymers also may be a class of settable materials, which rely on the dissolution, and subsequent condensation of aluminosilicate precursors to form a hardened mass. Geopolymers also may be referred to as polysialates.

The production of a geopolymer may be called geosynthesis. In some embodiments, geosynthesis may be a reaction process that may involve naturally occurring aluminosilicates. In some embodiments, geopolymers may be formed by chemical dissolution and subsequent re-condensation of various aluminosilicates and silicates to form a 3D-network or three-dimensional mineral polymer. In certain embodiments, geopolymers based on aluminosilicates may be designed as a poly(silate) (e.g., abbreviated form of poly(silicon-oxo-aluminate)). In one or more embodiments, the silate network may include silicate and aluminate tetrahedrals linked alternately by sharing all oxygens, with $Al^{3+}$ and $Si^{4+}$ in IV-fold coordination with oxygen. In certain embodiments, the geopolymer lost circulation materials may be present in the treatment fluid in any suitable concentration or loading. In some embodiments, the geopolymer may be present in an amount of about 4.0 pounds per gallon ("lbm/gal") to about 25.0 lbm/gal. In other embodiments, the geopolymer may be present in an amount of about 6.0 lbm/gal to about 20.0 lbm/gal. In still other embodiments, the geopolymer may be present in an amount of about 10.0 lbm/gal to about 16.0 lbm/gal.

Equation 1 below provides a geosynthesis reaction in accordance with certain embodiments of the present disclosure, which may not be representative of all geosynthesis reactions.

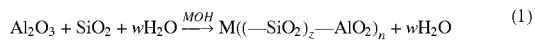

$$Al_2O_3 + SiO_2 + wH_2O \xrightarrow{MOH} M((-SiO_2)_z-AlO_2)_n + wH_2O \quad (1)$$

As depicted in Equation 1, in certain embodiments, aluminate, silicate, and metal hydroxide react to form the geopolymer. Further, in those embodiments, the metal hydroxide, MOH, may include group 1 and 2 hydroxides. In one or more embodiments, suitable metal hydroxides may include, but are not limited to, potassium hydroxide, sodium hydroxide, and calcium hydroxide. In Equation 1, the degree of polymerization is denoted by n and the atomic ratio of Si to Al is denoted by z.

Equation 2 below illustrates an embodiment wherein the metal ion may act as a counter ion to counterbalance the negative charge of the aluminum metal.

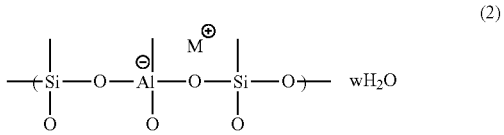

In one or more embodiments, the geosynthesis reaction may be kinetically favored due to the presence of the counter anion. In some embodiments, the metal hydroxide may act as an activator for the geosynthesis reaction and as a stabilizing agent to the final polymer matrix. In certain embodiment, other compounds may act as activators including, but are not limited to, chloride salts such as KCl, CaCl, and NaCl; carbonates such as $Na_2CO_3$; silicates such as sodium silicate; aluminates such as sodium aluminate; and ammonium hydroxide. In each case, the cation in the compound also may act as a counter anion. In some embodiments, a metal hydroxide and salt may be used together. In other embodiments, combinations of any salts, silicates, carbonates, aluminates, metal hydroxides, and ammonium hydroxide may act as an activator. In one or more embodiments, the activator may be dry mixed with the other components that may eventually react to form a geopolymer. The geopolymer lost circulation materials of the present disclosure may include a mixture of such components and an activator. In some embodiments, the activator may be in an aqueous solution. In certain embodiments, the activator may be included in an amount in the range of from about 1.0% to about 60.0% by weight of the geopolymer lost circulation material. In other embodiments, the activator may be included in an amount in the range of from about 5.0% to about 45.0% by weight of the geopolymer lost circulation material. In still other embodiments, the activator may be included in an amount in the range of from about 10.0% to about 30.0% by weight of the geopolymer lost circulation material. In certain embodiments, the amount of activator present in the geopolymer lost circulation materials relative to the amount the aluminosilicate source may be reduced while still forming a treatment fluid that exhibits thixotropic properties. In some embodiments, the activator may be present relative to the amount the aluminosilicate source in an amount about 50% of the activator found in a conventional geopolymer composition. In other embodiments, the activator may be present relative to the amount the aluminosilicate source in an amount about 30% of the activator found in a conventional geopolymer composition. In other embodiments, the activator may be present relative to the amount the aluminosilicate source in an amount about 25% of the activator found in a conventional geopolymer composition. In other embodiments, the activator may be present relative to the amount the aluminosilicate source in an amount about 20% of the activator found in a conventional geopolymer composition. In other embodiments, the activator may be present relative to the amount the aluminosilicate source in an amount about 10% of the activator found in a conventional geopolymer composition.

The aluminosilicate source may include any suitable aluminosilicate. In certain embodiments, the aluminosilicate may be a mineral that includes aluminum, silicon, and oxygen, plus counter-ions. In one or more embodiments, the aluminosilicate source may be chosen based at least in part on the specific properties of the aluminosilicate. For example, some minerals such as andalusite, kyanite, and sillimanite are naturally occurring aluminosilicate sources that have the same composition, $Al_2SiO_5$, but differ in crystal structure. The differences in the crystal structure of the aluminosilicate may provide different properties. For example, each of andalusite, kyanite, or sillimanite may react faster or slower and to different extents at the same temperature and pressure due to the differing crystal structures. In some embodiments, the final geopolymer created from any one aluminosilicate may have both microscopic and macroscopic differences such as mechanical strength and thermal resistivity resulting from the different aluminosilicate sources. In some embodiments, the aluminosilicate source may include, but is not limited to, metakaolin clays, calcined clays, partially calcined clays, kaolinite clays, lateritic clays, illite clays, hectorite, sepiolite, montmorillonite, illite, laponite, natural glasses, volcanic rocks, mine tailings, fly ash, slag, silica fume, crystalline silica, silica flour, cement kiln dust ("CKD"), diatomaceous earth, zeolite, shale, and agricultural waste ash (e.g., rice husk ash, sugar cane ash, and bagasse ash), agglomerated zeolite catalysts (such as FCC). In some embodiments, the aluminosilicate source is a clay, such as metakaolin, which may be combined with sodium hydroxide (metal hydroxide), sodium silicate (metal silicate), and water in optimum proportions to form a settable fluid with ideal rheological properties. Additionally, in certain embodiments, the clay may be combined with other aluminosilicates form a geopolymer with similar properties. In certain embodiments, the aluminosilicate source may be present in an amount in the range of from about 10.0% to about 60.0% by weight of the geopolymer lost circulation material. In other embodiments, the aluminosilicate source may be present in an amount in the range of from about 15.0% to about 45.0% by weight of the geopolymer lost circulation material. In still other embodiments, the aluminosilicate source may be present in an amount in the range of from about 20.0% to about 30.0% by weight of the geopolymer lost circulation material.

The metal silicate source may include any suitable metal silicate. A silicate may be any compound containing an anionic silicon compound. In some embodiments, the silicate may include an orthosilicate anion also known as silicon tetroxide anion, $(SiO_4)^{4-}$ or a hexafluorosilicate $(SiF_6)^{2-}$. In other embodiments, the silicate may include cyclic and single chain silicates which may have the general formula $(SiO_3^{2-})_n$ and sheet-forming silicates which may have the general formula $(Si_2O_5^{2-})_n$. In one or more embodiments, the silicate may have one or more metal cations associated with each silicate molecule. In some embodiments, suitable metal silicate sources and may include, but are not limited to, sodium silicate, magnesium silicate, and potassium silicate. In certain embodiments, the metal silicate source may be present in an amount in the range of from about 1.0% to about 50.0% by weight of the geopolymer cement composition. In other embodiments, the metal silicate source may be present in an amount in the range of from about 2.0% to about 25.0% by weight of the geopolymer cement composition. In still other embodiments, the metal silicate source may be present in an amount in the range of from about 3.0% to about 10.0% by weight of the geopolymer cement composition.

In certain embodiments, the treatment fluid may exhibit thixotropic properties or behavior. A thixotropic material is a material for which viscosity at least partially decreases over time when using a constant or increasing shear rate. As shear rate decreases, the viscosity at least partially increases over time and the material will gradually recover the original internal structure before shear. Shear rate may be increased, for example, by pumping the treatment fluid. Shear rate may be decreased, for example, by stopping, or reducing the rate of, the pumping of the treatment fluid or by a portion of the treatment fluid leaving the primary flow path of the pumped treatment fluid. Without being limited by theory, it is believed that in some embodiments a geopolymer may impart a thixotropic property to the treatment fluid. In some embodiments, the extent of a fluid's thixotropy may be measured by dial readings on a Fann viscometer at different rpm. In some embodiments, the dial readings on a Fann Yield Strength Adapter (FYSA) at 3 rpm may be substantially similar to the dial readings at 300 rpm for the treatment fluid at 127° F. (52.78° C.). In some embodiments, the geopolymer lost circulation materials may be present in a sufficient amount to cause the treatment fluid to exhibit a thixotropic property at some point after a geopolymer is formed. In some embodiments, the treatment fluids of the present disclosure may exhibit a thixotropic rate of from about 0.50 (lbf/100 sq.ft.)/min to about 50.0 (lbf/100 sq.ft.)/min. In other embodiments, the treatment fluids of the present disclosure may exhibit a thixotropic rate of from about 20.0 (lbf/100 sq.ft.)/min to about 45.0 (lbf/100 sq.ft.)/min. In still other embodiments, the treatment fluids of the present disclosure may exhibit a thixotropic rate of from about 25.0 (lbf/100 sq.ft.)/min to about 40.0 (lbf/100 sq.ft.)/min.

As used herein, the term "thixotropic rate" refers to the rate at which gel strength increases after the fluid flow stops. One convenient method to quantify this "thixotropic rate" is to subtract the "10 sec gel reading" from the "10 minute gel reading) and divide by 9.83 minutes. Thixotropic rate or thixotropy may also refer the rate at which the gel strength increases with resting time. Gel strength may refer to the initial maximum torque reading on a viscometer when rotation is turned on, after allowing the fluid to rest in the viscometer for a given period of time. For example, gel strengths for drilling muds, spacers and cement slurries may be measured as follows using either a conventional bob/sleeve or FYSA viscometer configuration: (1) collect RPM vs torque readings for various RPM's such as, but not limited to: 3, 6, 30, 60, 100, 200, 300 and 600 RPM's; (2) collect data above during RAMP UP and RAMP DOWN sequence; (3) when reaching the last RPM (3 RPM) during the RAMP DOWN, record the torque at 3 RPM; (4) turn off the viscometer for 10 seconds, then turn on the viscometer and record the highest torque reading (which will be during the initial start up of rotation); (5) repeat step 4 with 10 minutes of rest; (6) repeat step 4 with 30 minutes of rest; and (7) gel strength should be expressed in (lbf/100 sq.ft.), which is obtained by multiplying the peak torque reading by the viscometers K2 coefficient that converts torque to shear stress in units of lbf/100 sq.ft. Thixotropic rate may be measured by any known method, including, but not limited to computing the difference between the gel strength at 10 minutes and the gel strength at 10 seconds, which man be defined as GS,10 min–GS,10 sec, then computing the thixotropic rate by dividing (GS,10 min–GS,10 sec) by 9.83 minutes, thus providing units of [(lbf/100 sq.ft.)/min]. Alternatively, the thixotropic rate may also be defined as the slope of the line generated by plotting time (in minutes) for each gel strength on the X-axis and gel strength (in units of lbf/100 sq.ft.) on the Y-axis.

In one or more embodiments, the components of the geopolymer lost circulation materials may be combined in any order desired to form a treatment fluid that can be placed into a subterranean formation or used as a component of a treatment fluid. In certain embodiments, the components of the geopolymer lost circulation materials may be combined using any mixing device compatible with the composition, including but not limited to, a bulk mixer, for example. In some embodiments, the geopolymer lost circulation materials may be formed by dry blending dry components including the aluminosilicate source, the metal silicate source, and an activator. In one or more embodiments, the dry blend of the geopolymer lost circulation materials may then be combined with water (e.g., tap water, seawater, saltwater, etc.) to form a geopolymer slurry which may be included in a treatment fluid. In other embodiments, a dry blend of the geopolymer lost circulation materials may be combined directly with other components of a treatment fluid to form a treatment fluid.

The treatment fluids of the present disclosure may include any aqueous base fluid known in the art. As used herein, the term "base fluid" refers to the major component of the fluid (as opposed to components dissolved and/or suspended therein), and does not indicate any particular condition or property of that fluids such as its mass, amount, pH, etc. Aqueous base fluids that may be suitable for use in the methods and compositions of the present disclosure may include water from any source. This may include fresh water, salt water (e.g., water containing one or more salts dissolved therein), brine (e.g., saturated salt water), seawater, or any combination thereof. The aqueous base fluid may be from a source that does not contain compounds that adversely affect other components of a fluid. In certain embodiments of the present disclosure, an aqueous base fluid may include one or more ionic species, such as those formed by salts dissolved in water. For example, seawater and/or produced water may include a variety of divalent cationic species dissolved therein. In certain embodiments, the density of the aqueous base fluid may be adjusted, among other purposes, to provide additional particulate transport and suspension in the treatment fluids of the present disclosure. In certain embodiments, the pH of the aqueous base fluid may be adjusted (e.g., by a buffer or other pH adjusting agent) to a specific level, which may depend on, among other factors, other additional additives included in a fluid. One of ordinary skill in the art, with the benefit of this disclosure, will recognize when such density and/or pH adjustments are appropriate.

In certain embodiments, the treatment fluids of the present disclosure optionally may include any number of additional additives. Examples of such additional additives include, but are not limited to, silica; pozzolans; microspheres; viscosifying agents; suspending agents; salts; accelerants; surfactants; retarders; settling-prevention agents; weighting agents; vitrified shale; and combinations thereof. In some embodiments, the treatment fluid may contain rheology (e.g., viscosity and gel strength) modifiers and stabilizers. A person skilled in the art, with the benefit of this disclosure, will recognize the types of additives that may be included in the fluids of the present disclosure for a particular application.

In some embodiments, the treatment fluids of the present disclosure optionally may include a weighting agent. In some embodiments, the weighting agent may be added to produce a desired density in the treatment fluid. Examples of suitable weighting agents may include, but are not limited to barite, hematite, calcium carbonate, magnesium carbonate, iron carbonate, zinc carbonate, manganese tetraoxide, ilmenite, NaCl, KCl, formate salts, and the like, and any combination thereof. These weighting agents may be at least partially soluble or insoluble in the treatment fluid. In one or more embodiments, a weighting agent may be present in the treatment fluids in an amount within a range of from about 0.1% to about 60% by weight of the treatment fluid. In other embodiments, the weighting agents may be present in the treatment fluids in an amount within a range of from about 1% to about 35% by weight of the treatment fluid. In some embodiments, the weighting agent may be present in the treatment fluids in an amount within a range of from about 0.1% to about 1% by weight of the treatment fluid. A person skilled in the art, with the benefit of this disclosure, will recognize the types of weighting agent that may be included in the fluids of the present disclosure for a particular application.

In certain embodiments, the treatment fluids of the present disclosure may include a density-reducing additive. Examples of density reducing additives that may be suitable for certain embodiments of the present disclosure include, but are not limited to gas, hollow glass beads, pozzolanic microspheres, solid beads (e.g., solid organic or plastic beads), or any combination thereof.

In certain embodiments, the treatment fluid does not include a significant amount (e.g., no more than 0.5%, 0.4%, 0.3%, 0.2%, 0.1%, or 0.01%, all by weight of the treatment fluid) of a particulate bridging agent. In some embodiments, the treatment fluid is free or substantially free of particulates other than the geopolymer lost circulation material. In other embodiments, the treatment fluids of the present disclosure may include additional lost circulation materials or particulate bridging agents.

In certain embodiments, a surfactant may be used with a geopolymer lost circulation material. The surfactant may, among other purposes, help disperse the geopolymer lost circulation materials and/or other additives in a treatment fluid. A suitable surfactant may include an alkoxylated alkyl alcohol and salts thereof, an alkoxylated alkyl phenol and salts thereof, an alkyl or aryl sulfonate, a sulfate, a phosphate, a carboxylate, a polyoxyalkyl glycol, a fatty alcohol, a polyoxyethylene glycol sorbitan alkyl ester, a sorbitan alkyl ester, a polysorbate, a glucoside, a quaternary amine compound, an amine oxide surfactant, or any combination thereof.

In some embodiments, additional lost circulation materials may be included in the compositions as a secondary mechanism to cure the losses without altering the thixotropic behavior of the treatment fluid. In certain embodiments, the additional lost circulation materials may include, but are not limited to, resilient graphitic carbon, ground walnut shells, calcium carbonate and polymers, polymer flakes, cellophane flakes, melamine flakes, ground coal, calcium carbonate, and any combination thereof.

In certain embodiments, the additional lost circulation materials may include a plurality of fibers. Examples of synthetic fibers suitable for certain embodiments of the present disclosure include, but are not limited to, polymers or copolymers composed of polypropylene, polyaramid, polyester, polyacrylonitrile, and polyvinyl alcohol. Examples of biodegradable fibers include, but are not limited to, fibers composed of modified cellulose, chitosan, soya, modified chitosan, polycaprolactone, polylactic acid, poly (3-hydroxybutyrate), polyhydroxy-alkanoates, polyglycolic acid ("PGA"), polylactic acid ("PLA"), polyorthoesters, polycarbonates, polyaspartic acid, polyphosphoesters, soya, or copolymers thereof. Examples of natural fibers suitable for certain embodiments of the present disclosure include, but are not limited to, fibers of cellulose including viscose cellulosic fibers, oil coated cellulosic fibers, and fibers derived from a plant product like paper fibers. Examples of other suitable fibers include, but are not limited to, carbon including carbon fibers; melt-processed inorganic fibers including basalt fibers, wollastonite fibers, non-amorphous metallic fibers, ceramic fibers, glass fibers, and other mineral fibers. The fibers also may be a composite fiber made from any combination of the preceding materials. In certain embodiments, the fibers may have a length to diameter aspect ratio in the range of about 2:1 to about 5,000:1. In certain embodiments, these additional lost circulation materials may be fibrous materials, such as shredded automobile tires or sawdust. In other embodiments, these additional lost circulation materials may be flaky materials, such as wood chips and mica flakes. In still other embodiments, these additional lost circulation materials may be granular materials, such as ground nutshells, ground rubber, formica, ground coal, and plastics.

In some embodiments, the additional lost circulation materials may have a specific gravity in the range of from about 0.7 to about 4.0. In some embodiments, the additional lost circulation materials may have a hardness (Brinell value) in the range of from about 0.1 to about 500. In some embodiments, the additional lost circulation materials may have a Brinell value in the range of from about 0.1 to about 10. In other embodiments, the additional lost circulation materials may have a Brinell value in the range of from about 10.1 to about 200. In still other embodiments, the additional lost circulation materials may have a Brinell value in the range of from about 201 to about 500. In certain embodiments, the lost circulation materials may have geometries ranging from: spheres; ellipsoids; platelets; flakes; and fibers.

The treatment fluids of the present disclosure may be prepared using any suitable method and/or equipment (e.g., blenders, mixers, stirrers, etc.) known in the art at any time prior to their use. The treatment fluids may be prepared at a well site or at an offsite location.

In certain embodiments, the methods of the present disclosure may include introducing at least a portion of the treatment fluids into a loss zone or other flow path and allowing a treatment fluid of the present disclosure exhibiting a thixotropic property to at least partially reduce losses within the loss zone. In some embodiments, the treatment fluids of the present disclosure may reduce losses within the loss zone upon entering the loss zone by experiencing less shear forces as a result of leaving the flow path of the pumped treatment fluid. In one or more embodiments, the treatment fluids of the present disclosure may reduce losses within the loss zone by experiencing an increase in the viscosity of the treatment fluid. In other embodiments, the treatment fluids of the present disclosure may reduce losses within the loss zone by allowing the treatment fluid to at least partially set (e.g., form a solid, semi-solid, gel, plug, etc.). In some embodiments, the treatment fluids may be introduced into the wellbore to prevent the loss of aqueous or non-aqueous fluids into loss zones such as voids, vugular zones, perforations, and natural or induced fractures. In certain embodiments, the treatment fluids may form a non-flowing, intact mass inside the loss zone which plugs the zone and inhibits loss of subsequently pumped additional fluid systems (spacers, mud efficiency fluids, etc.), which allows for further drilling. For example, in certain embodiments, the treatment fluid may function as a plug that is placed into the wellbore and prepares the formation for placement of a second (e.g., primary cementing) composition. In certain embodiments, the treatment fluid may be introduced into the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to be used as a fluid in front of cementing fluid in cementing operations to prevent the loss of cementing fluids (e.g., slurry or water) into loss circulation zones such as a void, vugular zone, or fracture; to seal an annulus between the wellbore and an expandable pipe or pipe string; or combinations thereof. In some embodiments, one or more treatment fluids may at least partially plug a loss zone. In certain embodiments, a treatment fluid including the geopolymer lost circulation materials of the present disclosure may set, or at least partially set, and at least partially plug a loss zone.

In some embodiments, the methods of the present disclosure may include foaming the treatment fluid by injecting air, nitrogen, an appropriate foamer, or any combination thereof. In some embodiments, the methods of the present disclosure may include foaming the geopolymer lost circulation materials by injecting air, nitrogen, an appropriate foamer, or any combination thereof. In certain embodiments, this may increase the volume of the treatment fluid or geopolymer lost circulation materials to allow the plugging of a larger loss zone. In other embodiments, this may reduce the cost of the treatment fluid or geopolymer lost circulation materials. In certain embodiments, foaming the treatment fluid may introduce air bubbles that may reduce the setting speed of the treatment fluid.

In other embodiments, the geopolymer lost circulation materials of the present disclosure may be added to one or more cements. In certain embodiments, this may increase the speed of initial compressive strength development in the cement at high temperatures. In certain embodiments, the treatment fluid may set while the cement phase continues to cure. In some embodiments, this may reduce premature curing or setting of the cement. In other embodiments, this may increase the compressive strength of the resulting material. In certain embodiments, this may result in a lower density cement with a compressive strength comparable to that of a high-density cement lacking the geopolymer lost circulation material.

In some embodiments, the treatment fluid or geopolymer lost circulation materials of the present disclosure may be removed from the subterranean formation and/or the loss zone. For example, in certain embodiments, the set treatment fluid or geopolymer lost circulation materials may be drilled out using a drill bit. In certain embodiments, this may re-open closed fractures or a diverter area. In other embodiments, the set treatment fluid or geopolymer lost circulation materials may be removed from the loss zone by flowing back the well. In some embodiments, the treatment fluid or geopolymer lost circulation materials of the present disclosure may be degraded or dissolved. Such degradation or dissolution may occur over time, in response to contacting the treatment fluid or geopolymer lost circulation materials with an acidic fluid, or in response to one or more downhole conditions.

In certain embodiments, when a portion of the treatment fluid enters into a loss zone in the subterranean formation, the shear rate on it may decrease drastically. This triggers a steep increase in the gel strength which in turn results in the treatment fluid stopping near the wellbore. Thus, effective near wellbore screen out is achieved as early as possible increasing the resistance to flow into the loss zone. Due to the increase in flow resistance, the succeeding cement train may prefer to flow through the annulus instead of flowing into the loss zone. The amount of time required to stop flow and the volume swept may depend on the type of loss zone, the differential pressure applied across the loss zone, the volume of the treatment fluid, and the gel strength build up rate of the treatment fluid. In some embodiments, the gel strength increase is quantified based on the 10 minute gel strength.

In certain embodiments, the treatment fluids of the present disclosure may be suitable for use at a variety of temperatures, pH levels, water salinities, and mineralogies of subterranean formations. In some embodiments, the materials that make up the treatment fluids may at least partially set and/or be stable at high temperatures. In certain embodiments, the materials that make up the treatment fluids may function at temperatures above 32° C. (90° F.) and above 127° C. (260° F.). Thus, in certain embodiments, the treatment fluids and methods of the present disclosure may provide effective loss zone treatment, plug formation, and other wellbore treatment, even when used in conditions at or above 127° C. (260° F.). Additionally, the treatment fluids of the present disclosure may be suitable for a variety of subterranean formations, including, but not limited to, shale formations and carbonate formations. In certain embodiments, the subterranean formation may have a bottom hole temperature of from about 66° C. (150° F.) to about 204° C. (400° F.). In certain embodiments, the subterranean formation may have a bottom hole temperature of at least about 177° C. (350° F.).

The methods and compositions of the present disclosure may be used in a variety of applications. These include downhole applications (e.g., cementing, drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In certain embodiments, a wellbore may be drilled and the treatment fluid may be circulated in the wellbore during, before, or after the drilling. In some embodiments, the treatment fluid may be circulated in the wellbore after drilling but prior to a primary cementing operation. In some embodiments, the treatment fluid may be introduced into a subterranean formation via a single flow path (e.g., drill pipe, annulus, etc.). Introduction of the treatment fluids of the present disclosure may in certain embodiments include delivery via any of a tube, umbilical, pump, gravity, and combinations thereof. The treatment fluids of the present disclosure may, in various embodiments, be delivered downhole (e.g., into the wellbore) or into topside flow lines/pipelines or surface treating equipment. For example, in certain embodiments, the treatment fluids of the present disclosure may be applied to a subterranean formation and/or wellbore using batch treatments, squeeze treatments, continuous treatments, and/or combinations thereof.

The treatment fluids disclosed herein may directly or indirectly affect one or more components or pieces of equipment associated with the preparation, delivery, recapture, recycling, reuse, and/or disposal of the treatment fluids of the present disclosure. For example, the methods and compositions of the present disclosure may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary treatment fluids. The disclosed treatment fluids also may directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The treatment fluids of the present disclosure also may directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

For example, and with reference to FIG. 1, the treatment fluids of the present disclosure may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the borehole 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed treatment fluids may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the treatment fluids of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the treatment fluids of the present disclosure may be stored, reconditioned, and/or regulated until added to the wellbore fluid 122.

As mentioned above, the treatment fluids of the present disclosure may directly or indirectly affect the components and equipment of the drilling assembly 100. For example, the treatment fluids of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary treatment fluids.

The treatment fluids of the present disclosure may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The treatment fluids of the present disclosure also may directly or indirectly affect the mixing hopper 134 and the retention pit 132 and their assorted variations.

The treatment fluids of the present disclosure also may directly or indirectly affect the various downhole equipment and tools that may come into contact with the treatment fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The treatment fluids of the present disclosure also may directly or indirectly affect any downhole heat exchangers, valves and corresponding actuation devices, tool seals, packers and other wellbore isolation devices or components, and the like associated with the wellbore 116. The treatment fluids of the present disclosure also may directly or indirectly affect the drill bit 114, which may include, but is not limited to, roller cone bits, PDC bits, natural diamond bits, any hole openers, reamers, coring bits, etc.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

In certain embodiments, the methods and compositions of the present disclosure may include geopolymer lost circulation materials that may unexpectedly exhibit properties useful in well bore applications when the amount of activator solution is varied relative to the amount of aluminosilicate as shown in the example below. For example, in some embodiments, the geopolymer lost circulation materials may result in fluids that are highly thixotropic and still set to form a hardened material.

Six geopolymer slurries were prepared following the formulations listed in Table 1 below. The slurries were prepared as follows: First, the activator solution was prepared by combining the sodium silicate, sodium hydroxide and water (activator). The activator solution was stirred until all components were dissolved and then set aside and allowed to cool to room temperature. After cooling, the additional water was placed in a Waring blender and the prescribed amount of activator solution was added, with mixing. Metakaolin and silica sand, which had been previously dry blended, were then slowly added to the mixture to create the slurries. The slurries were then blended for 35 seconds at 5000 RPM.

TABLE 1

Geopolymer slurry formulations with various amounts of activator solution.

| | Material | GPSC-1 (10% Activator Solution) wt. (g) | GPSC-2 (20% Activator Solution) wt. (g) | GPSC-3 (25% Activator Solution) wt. (g) | GPSC-4 (30% Activator Solution) wt. (g) | GPSC-5 (50% Activator Solution) wt. (g) | GPSC-6 (comparative) wt. (g) |
|---|---|---|---|---|---|---|---|
| | Metakaolin | 100 | 100 | 100 | 100 | 100 | 100 |
| | Silica Sand | 100 | 100 | 100 | 100 | 100 | 100 |
| Activator | Sodium Silicate | 5.4 | 10.8 | 13.5 | 16.2 | 27 | 54 |
| Solution | Sodium Hydroxide | 0.6 | 1.1 | 1.4 | 1.7 | 2.9 | 5.8 |
| | Water (activator) | 9 | 18 | 22.6 | 27.1 | 45.1 | 54 |
| | Water (additional) | 80 | 80 | 80 | 80 | 80 | 80 |
| | Slurry Density (ppg) | 15 | 14.7 | 14.6 | 14.4 | 14 | 13.3 |

Rheological and gel strength measurements were performed on the slurries using a Fann 35 viscometer with a FYSA attachment at room temperature following API 10B-2 procedures. The results of those tests are reported in Table 2 below. One method of quantifying thixotropic performance is to compute the thixotropic rate as follows:

Thixotropic Rate=(10 min gel–10 sec gel)/9.8 min

Expressed in units of (lbf/100 sq.ft.)/min.

TABLE 2

Rheological, gel strength values and thixotropy rates for geopolymer fluids

| Slurry Name | Slurry Density (ppg) | Rheology on FYSA Analyzer | | | | | | | Gel Strength (lbf/100 ft$^2$) on FYSA Analyzer | | Thixotropic Rate (lbf/100 sq.ft./min) |
|---|---|---|---|---|---|---|---|---|---|---|---|
| | | 3 rpm | 6 rpm | 30 rpm | 60 rpm | 100 rpm | 200 rpm | 300 rpm | 10 Sec | 10 min | |
| GPSC-1 | 15 | 182 | 182 | 182 | 182 | 229 | 231 | 229 | 214 | 222 | 0.81 |
| GPSC-2 | 14.7 | 64 | 64 | 66 | 67 | 68 | 74 | 79 | 65 | 90 | 2.54 |
| GPSC-3 | 14.5 | 36 | 36 | 36 | 37 | 37 | 38 | 38 | 40 | 407 | 37.3 |
| GPSC-4 | 14.4 | 28 | 28 | 28 | 28 | 29 | 30 | 31 | 39 | 310 | 27.6 |
| GPSC-5 | 14 | 5 | 5 | 6 | 7 | 9 | 13 | 19 | 12 | 384 | 37.8 |
| GPSC-6 (comparative) | 13.2 | 0.3 | 0.4 | 1 | 2 | 4 | 10 | 17 | 0.3 | 1 | 0.071 |

As can be seen in Table 2, all six slurry formulations, with the exception of the conventional formulation (GPCS-6), exhibited relatively flat rheological profiles on shearing at the different rotational speeds. Also, as shown by the static gel strength measurements, each of the geopolymers in slurries GPSC-1 through GPSC-5 rapidly developed significant gel strength and thixotropic rates.

Following the gel strength measurements, each of the slurries was cured in cylinders in a water bath at 140° F. for 7 days and then crushed using a Tinnius Olsen load frame. The 2×4 inch cylinders were crushed unconfined, at a strain rate of 0.05 in/min. The crush strength was computed by dividing the maximum force by the cross sectional area of the 2×4 inch test cylinder, which is 3.14 square inches. The crush strength of each of the cured slurries is presented in Table 3 below.

TABLE 3

Crush strength of geopolymer formulations

| Slurry Name | Crush Strength (psi) |
|---|---|
| GPSC-1 | 0 |
| GPSC-2 | 72 |
| GPSC-3 | 21 |
| GPSC-4 | 16 |
| GPSC-5 | 34 |
| GPSC-6 (comparative) | 57 |

Figure 2:
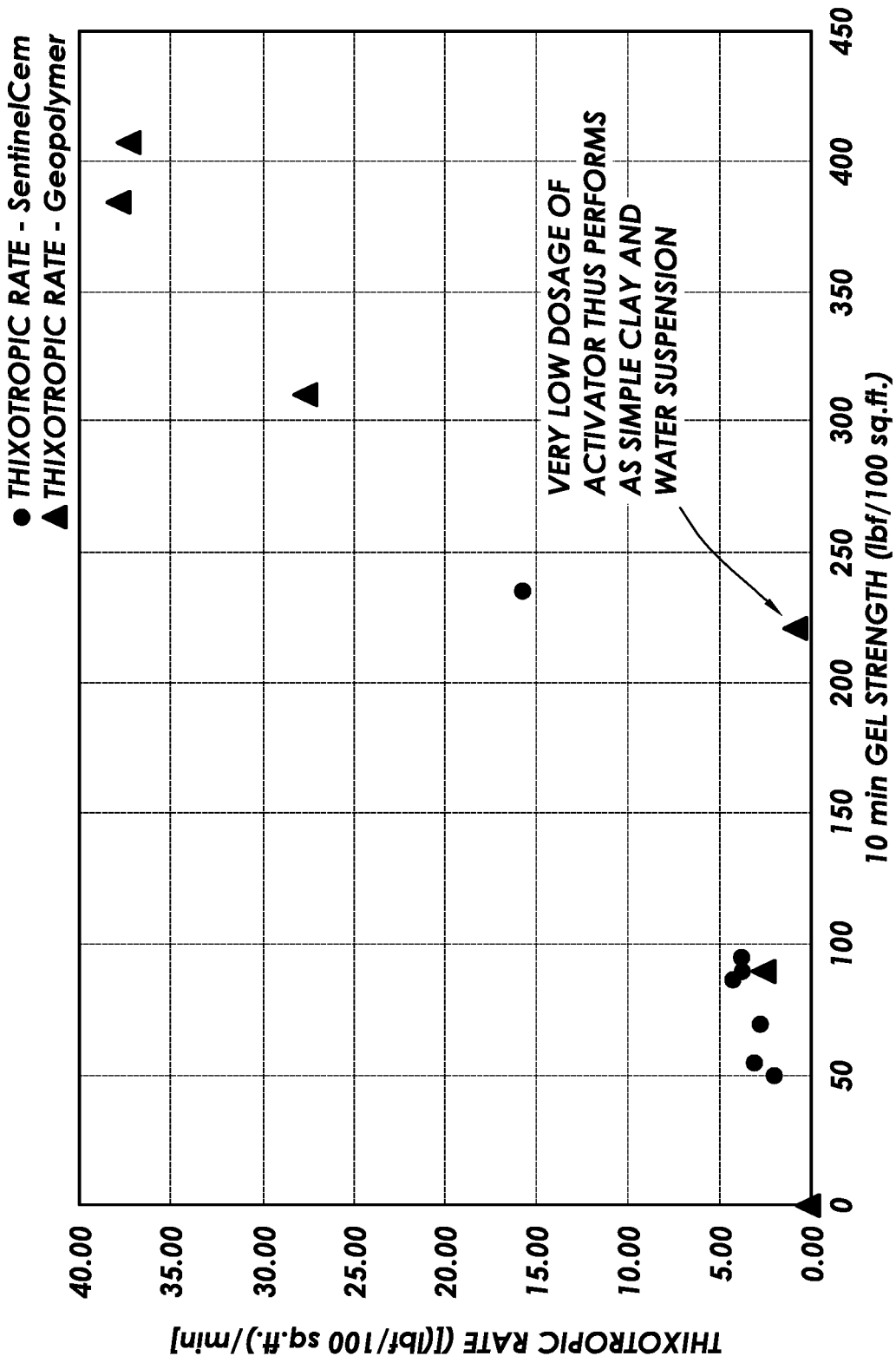
FIG. 2 is a graph illustrating data in accordance with certain embodiments of the present disclosure.

FIG. 2 shows a plot of the gel strength data against data from Portland cement slurries to provide a comparison of the performance of the geopolymer slurries above with certain other thixotropic fluids. The result of dividing the 10 minute gel strengths and 10 second gel strengths was used as the y-axis and the 10 minute gel strength value was used as the x-axis. Plotting the data in this manner illustrates how the proposed disclosure significantly extends thixotropic functionality of a Portland cement type product. It is important to note that not only does the proposed disclosure extends the range of the geopolymer gel strength, but also extends the rate at which the gel strengths develops.

Example 2

The following example illustrates that Portland cement/geopolymer composites also may lead to the formation of cementitious slurries that develop high gel strengths more quickly than other slurries. The slurries in Example 2 were prepared using the same procedure as those in Example 1 with the addition of Portland cement to the dry blend to one slurry sample.

TABLE 4

Geopolymer slurry formulations with and without Portland Cement

| Material | GPSC-4 + 5% Portland wt. (g) | GPSC-4 wt. (g) |
|---|---|---|
| Metakaolin | 100.0 | 100.0 |
| Silica Sand | 100.0 | 100.0 |
| Activator Solution | | |
| Sodium Silicate | 16.2 | 16.2 |
| Sodium Hydroxide | 1.7 | 1.7 |
| Water (activator) | 27.1 | 27.1 |
| Portland | 10.0 | — |
| Water (additional) | 86.0 | 80.0 |
| Slurry Density (ppg) | 14.4 | 14.4 |

TABLE 5

Rheological and gel strength values for geopolymer fluids with and without Portland Cement

| Slurry Name | Slurry Density (ppg) | Rheology on FYSA Analyzer | | | | | | | Gel Strength (lbf/100 ft²) on FYSA Analyzer | | Thixotropic Rate [(lbf/100 sq.ft.)/min] |
|---|---|---|---|---|---|---|---|---|---|---|---|
| | | 3 rpm | 6 rpm | 30 rpm | 60 rpm | 100 rpm | 200 rpm | 300 rpm | 10 Sec | 10 min | |
| GPSC-4 | 14.4 | 28 | 28 | 28 | 28 | 29 | 30 | 31 | 38 | 310 | 27.7 |
| GPSC-4 + Portland | 14.4 | 16 | 16 | 19 | 21 | 23 | 26 | 31 | 28 | 332 | 30.9 |

Following the gel strength measurements, each of the slurries was cured in a water bath at 140° F. for 7 days and then crushed using a Tinnius Olsen load frame. The 2×4 inch cylinders were crushed unconfined, at a strain rate of 0.05 in/min. The crush strength was computed by dividing the maximum force by the cross sectional area of the 2×4 inch test cylinder, which is 3.14 square inches. The crush strength of each of the cured slurries is presented in Table 6 below.

TABLE 6

Crush strength of geopolymer formulations with and without Portland Cement

| Slurry Name | Crush Strength (psi) |
|---|---|
| GPSC-4 | 16 |
| GPSC-4 + 5% Portland cement | 16 |

An embodiment of the present disclosure is a method that includes forming a treatment fluid including a geopolymer lost circulation material; introducing the treatment fluid into at least a portion of a subterranean formation that includes at least one loss zone; activating the geopolymer lost circulation materials to form a geopolymer that imparts a thixotropic property to the treatment fluid; and allowing the treatment fluid exhibiting the thixotropic property to at least partially reduce a rate of loss associated with the loss zone.

In one or more embodiments described in the preceding paragraph, the method further includes allowing the treatment fluid to at least partially plug the loss zone. In one or more embodiments described above, the step of allowing the treatment fluid exhibiting the thixotropic property to at least partially reduce the rate of loss associated with the loss zone includes at least partially increasing a viscosity of the treatment fluid. In one or more embodiments described above, the geopolymer lost circulation materials include an aluminosilicate source, a metal silicate source, an activator, and water. In one or more embodiments described above, the aluminosilicate source is a metakaolin clay. In one or more embodiments described above, the metal silicate source is a sodium silicate. In one or more embodiments described above, the activator is sodium hydroxide. In one or more embodiments described above, the metal silicate source, activator, and water are present in an amount relative to an amount of the aluminosilicate source of about 50% or less of an amount of activator found in a conventional geopolymer. In one or more embodiments described above, the treatment fluid further includes a freezing point inhibitor. In one or more embodiments described above, the treatment fluid is thixotropic. In one or more embodiments described above, the treatment fluid is introduced into the subterranean formation using one or more pumps. In one or more embodiments described above, the treatment fluid further includes at least one additional lost circulation material. In one or more embodiments described above, the additional lost circulation material has a specific gravity of from about 0.7 to about 4.0. In one or more embodiments described above, the method further includes allowing the treatment fluid to plug substantially all of the loss zone.

Another embodiment of the present disclosure is a composition including a base fluid; and a geopolymer lost circulation material, wherein the geopolymer lost circulation materials include an aluminosilicate source, a metal silicate source; an activator; and water.

In one or more embodiments described in the preceding paragraph, the aluminosilicate source is a metakaolin clay, the metal silicate source is a sodium silicate, and the activator is sodium hydroxide. In one or more embodiments described above, the base fluid includes at least one component selected from the group consisting of: water, salt water, brine, seawater, and any combination thereof. In one or more embodiments described above, the composition further includes at least one additional lost circulation material.

Another embodiment of the present disclosure is a method that includes introducing a treatment fluid including a base fluid and one or more geopolymer lost circulation materials into a well bore penetrating at least a portion of a subterranean formation that includes at least one loss zone, wherein the geopolymer lost circulation materials include an aluminosilicate source, a metal silicate source, an activator, and water; activating the geopolymer lost circulation materials to form a geopolymer that imparts a thixotropic property to the treatment fluid; and allowing the treatment fluid exhibiting the thixotropic property to at least partially reduce a rate of loss associated with the loss zone.

In one or more embodiments described in the preceding paragraph, the aluminosilicate source is a metakaolin clay, the metal silicate source is a sodium silicate, and the activator is sodium hydroxide.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    forming a treatment fluid comprising water and an aluminosilicate source;
    adding an activator composition comprising a metal silicate source, an activator, and water to the treatment fluid, wherein the activator composition imparts a thixotropic property to the treatment fluid;
    introducing the treatment fluid into at least a portion of a subterranean formation that comprises at least one loss zone; and
    allowing the treatment fluid exhibiting the thixotropic property to at least partially reduce a rate of loss associated with the loss zone, wherein the treatment fluid has a thixotropic rate of from about 27.6 lbf/100 ft$^2$/min to about 50.0 lbf/100 ft$^2$/min.

2. The method of claim 1 further comprising allowing the treatment fluid to at least partially plug the loss zone.

3. The method of claim 1, wherein the step of allowing the treatment fluid exhibiting the thixotropic property to at least partially reduce the rate of loss associated with the loss zone comprises at least partially increasing a viscosity of the treatment fluid.

4. The method of claim 1, wherein the aluminosilicate source is a metakaolin clay.

5. The method of claim 1, wherein the metal silicate source is a sodium silicate.

6. The method of claim 1, wherein the activator is sodium hydroxide.

7. The method of claim 1, wherein the metal silicate source and water in the activator composition are present in an amount relative to an amount of the aluminosilicate source of about 72.1% or less.

8. The method of claim 1, wherein the treatment fluid is introduced into the subterranean formation using one or more pumps.

9. The method of claim 1, wherein the treatment fluid further comprises at least one additional lost circulation material.

10. The method of claim 9, wherein the additional lost circulation material has a specific gravity of from about 0.7 to about 4.0.

11. The method of claim 1 further comprising allowing the treatment fluid to plug substantially all of the loss zone.

12. The method of claim 1, wherein the aluminosilicate source is a metakaolin clay, the metal silicate source is a sodium silicate, and the activator is sodium hydroxide.

13. The method of claim 1, wherein the aluminosilicate source is present in the treatment fluid in an amount of from about 10.0% to about 60.0% by weight of the treatment fluid.

14. The method of claim 1, wherein the metal silicate source is present in the treatment fluid in an amount of from about 1.0% to about 50.0% by weight of the treatment fluid.

15. The method of claim 1, wherein the activator is present in the treatment fluid in an amount of from about 1.0% to about 60.0% by weight of the treatment fluid.

16. A method comprising:
introducing a treatment fluid comprising a base fluid, an aluminosilicate source, and an activator composition into a well bore penetrating at least a portion of a subterranean formation that comprises at least one loss zone, wherein the activator composition comprises a metal silicate source, an activator, and water, and wherein the activator composition imparts a thixotropic property to the treatment fluid; and
allowing the treatment fluid exhibiting the thixotropic property to at least partially reduce a rate of loss associated with the loss zone, wherein the treatment fluid exhibiting the thixotropic property has a crush strength of about 72 psi or less when measured after 7 days.

17. The method of claim 16, wherein the aluminosilicate source is a metakaolin clay, the metal silicate source is a sodium silicate, and the activator is sodium hydroxide.

* * * * *